United States Patent [19]

Kozlovsky et al.

[11] Patent Number: 5,027,361
[45] Date of Patent: Jun. 25, 1991

[54] EFFICIENT LASER HARMONIC GENERATION EMPLOYING A LOW-LOSS EXTERNAL OPTICAL RESONATOR

[75] Inventors: William J. Kozlovsky, Los Altos; Charles D. Nabors, Palo Alto; Robert L. Byer, Stanford, all of Calif.

[73] Assignee: Board of Trustees of Leland Stanford, Jr., University, Stanford, Calif.

[21] Appl. No.: 209,528

[22] Filed: Jun. 21, 1988

[51] Int. Cl.⁵ .......................... H01S 3/10; H03F 7/00
[52] U.S. Cl. ..................... 372/22; 307/427; 372/21
[58] Field of Search ...................... 307/427; 372/21, 22

[56] References Cited

U.S. PATENT DOCUMENTS

| 3,530,301 | 9/1970 | Boyd et al. | 307/427 |
| 4,578,793 | 3/1986 | Kane et al. | 372/94 |
| 4,731,787 | 3/1988 | Fan et al. | 372/22 |
| 4,739,507 | 4/1988 | Byer et al. | 372/22 |
| 4,749,842 | 6/1988 | Kane et al. | 219/201 |
| 4,764,933 | 8/1988 | Kozlovsky et al. | 372/40 |

OTHER PUBLICATIONS

Brieger, et al., "Enhancement of Single Frequency SGH in a Passive Ring Resonator", Optics Comm. 38:5,6 (1981) pp. 423–426.
Ashkin, et al., "Resonant Optical Second Harmonic Generation and Mixing", IEEE J. Quant. Electron, QE-2 (1966) pp. 109–1124.
Baumert, et al., "High-Efficiency Intracavity Frequency Doubling of a Styryl-9 Dye Laser With KNbO₃ Crystals", Applied Optics 24:9 (1985) pp. 1299–1301.
Bergquist, et al., "High Power Second Harmonic Generation of 257 nm Radiation in an External Ring Cavity", Optics Comm. 43:6 (1982) pp. 437–442.

Primary Examiner—William L. Sikes
Assistant Examiner—Georgia Y. Epps
Attorney, Agent, or Firm—Flehr, Hohbach, Test, Albritton & Herbert

[57] ABSTRACT $TEM_{00q}$ laser radiation derived from a diode-pumped ring laser is directed into a faceted member of nonlinear optical material defining either a standing wave or ring monolithic optical resonator to generate harmonic laser radiation. The losses of the optical resonator, exclusive of the conversion loss to the harmonic, are made sufficiently low such that the dominant loss presented to the resonated mode of the optical resonator is the conversion loss to the generated harmonic. The reflectance of the input mirror of the optical resonator is impedance matched to the losses of the resonator including the harmonic conversion loss for optimum conversion efficiency. The length of the nonlinear optical material is shortened to the point where the bulk losses are less than ten times the sum of the surface and mirror losses, yielding conversion efficiencies of greater than 20 percent.

18 Claims, 4 Drawing Sheets

EFFICIENT LASER HARMONIC GENERATION EMPLOYING A LOW-LOSS EXTERNAL OPTICAL RESONATOR

GOVERNMENT CONTRACT

The present invention was made in performance of government contracts with the Army Research Office (DAAG29-84-K-0071) and the National Aeronautics and Space Agency (NAG-1-182) and the government has certain rights therein.

BACKGROUND OF THE INVENTION

The present invention relates in general to laser harmonic generation and, more particularly, to a laser harmonic generator having improved conversion efficiency.

DESCRIPTION OF THE PRIOR ART

Heretofore, approaches to cw nonlinear second harmonic generation have concentrated on intracavity frequency doubling, intracavity sum generation, and self-frequency doubling, where advantage is taken of the high circulating power of the fundamental wave energy present inside the laser optical resonator. Although such internal laser harmonic generators yield good conversion efficiencies, they usually oscillate in several axial modes resulting in large amplitude fluctuations at the second harmonic.

An approach that avoids these large amplitude fluctuations includes the use of an external optical resonator to enhance the fields present in the doubling crystal. In such laser harmonic generators, power enhancements up to 20 in the nonlinear doubling material have been reported. However, the conversion efficiencies have been relatively low, i.e., less than 6 percent, due to the relatively high external optical resonator losses, i.e., single-pass losses of 4 percent for a standing wave optical resonator and 6.6 percent round trip losses for an external optical ring resonator. In all these prior art cases the loss presented to the resonated mode at the fundamental wavelength (fundamental mode), due to conversion to the second harmonic, was insignificant compared to the other resonator losses.

It is also known from the aforedescribed prior art to impedance match the reflectance of the input coupling mirror of the external optical resonator to the losses of the resonator for optimizing conversion efficiency. However, such impedance matching of the input coupling mirror did not take into account the conversion losses to the second harmonic and therefore did not represent an impedance matched condition for coupling into the external optical resonator where the loss to the second harmonic conversion is a significant loss presented to the resonated mode of the resonator.

Examples of such external resonator laser harmonic generators are found in one or more of the following articles, hereby incorporated by reference: IEEE J. Quantum Electronics, Vol. QE-2, pp. 109-124, June 1966; Optical Communications, Vol. 38, pp. 423-426, September 1981; Optical Communications, Vol. 43, pp. 437-442, Nov. 15, 1982; and Applied Optics, Vol. 24, pp. 1299-1301, May 1, 1985.

It would be highly desirable to obtain laser harmonic generation in an external optical resonator with improved conversion efficiency.

SUMMARY OF THE PRESENT INVENTION

The principal object of the present invention is the provision of laser harmonic generation in an external optical resonator with improved conversion efficiency.

In one feature of the present invention, the losses of the external optical resonator, including the nonlinear optical material, but excluding the transmission of the input coupling mirror are reduced such that a significant loss of the resonated mode at the fundamental wavelength is the conversion loss to the generated harmonic, whereby the conversion efficiency is increased substantially.

In another feature of the present invention, the reflectance of the input coupler to the external optical resonator is impedance matched to the losses of the resonated mode, including the conversion losses, so that optimum conversion efficiency is obtained.

In another feature of the present invention, the figure of merit ($d_{eff}/\alpha$) of the nonlinear optical material is selected from the group consisting of $\geq 4 \times 10^{-12}$ ($m^2/v$) incident laser radiation of less than 100 mW; $\geq 2 \times 10^{-12}$ ($m^2/v$) for incident laser radiation laser power less than 300 mW but $\geq 50$ mW, and $1 \times 10^{-12}$ ($m^2/v$) for incident laser radiation power less than 2 W but greater than 200 mW for improved conversion efficiency. $d_{eff}$ is the second order non-linear coefficient of the material, whereas $\alpha$ is the loss coefficient of such material.

In another feature of the present invention, the nonlinear optical material is dimensioned to be sufficiently short such that the bulk losses of the nonlinear material are less than ten times the surface and mirror losses (defined as excluding the transmission of the input coupling mirror) presented to the resonated mode of the external optical resonator, whereby fabrication is facilitated, material costs reduced, temperature phasematching achieved over a wider range of temperatures, and angle phasematching allowed with certain nonlinear materials such as KTP, KDP, and barium borate that would ordinarily have too large a walk off angle.

In another feature of the present invention, the mirrors defining the external optical resonator comprise reflective facets of the nonlinear optical material, whereby a monolithic external resonator is obtained having reduced resonator losses for the resonated mode at the fundamental wavelength.

In another feature of the present invention, the nonlinear optical material is selected from the group consisting of potassium niobate, KTP, KDP, KD*P and isomorphs, lithium iodate, barium borate, lithium niobate and MgO:LiNbO$_3$.

In another feature of the present invention, the external optical resonator comprises a ring resonator.

In another feature of the present invention, the external optical resonator is excited with TEM$_{00q}$ laser radiation derived from a non-planar ring laser, whereby conversion efficiency and frequency stability are increased.

In another feature of the present invention, the laser radiation incident on the external optical resonator and the resonated mode of the external resonator are tuned to the same wavelength, whereby the conversion efficiency is increased.

In another feature of the present invention, the nonlinear optical material is crystalline MgO:LiNbO$_3$ with its crystallographic (a) axis disposed parallel to the incident beam of fundamental laser radiation which is polarized parallel to the crystallographic Y-axis of the crystal.

Other features and advantages of the present invention will become apparent upon a perusal of the following specification taken in connection with the accompanying drawings wherein:

DESCRIPTION OF PREFERRED EMBODIMENTS

Figure 1:
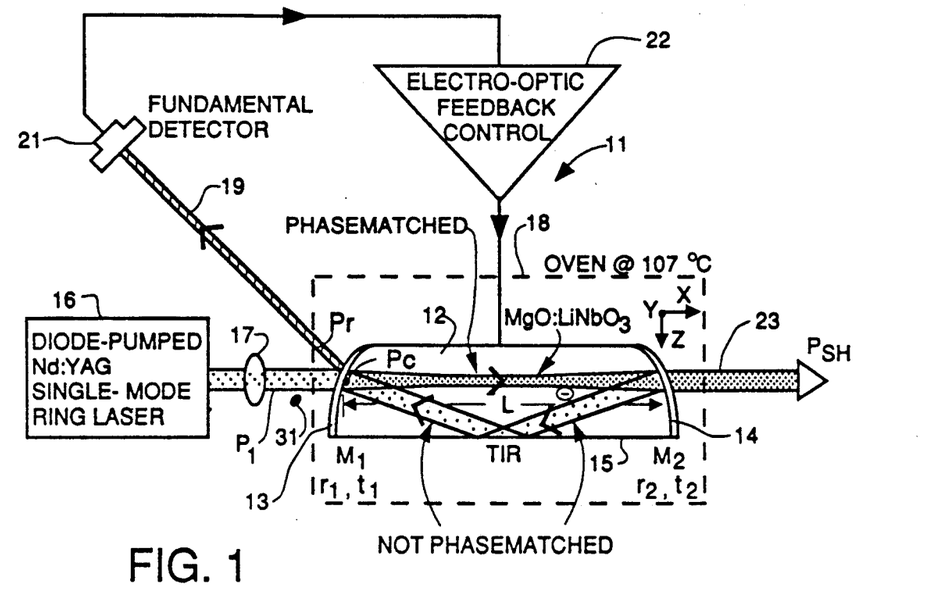
FIG. 1 is a schematic line diagram, partly in block diagram form, of a laser harmonic generator incorporating features of the present invention.

Referring now to FIG. 1, there is shown a laser harmonic generator 11 incorporating features of the present invention. Harmonic generator 11 includes a member of nonlinear optical material 12 disposed within an external ring optical resonator defined between internally reflective facets 13, 14, and 15 of the nonlinear optical material 12.

A resonant mode of the ring resonator is excited at the wavelength of fundamental laser radiation derived from a laser diode-pumped Nd:YAG single-mode ring laser 16 and focused by a lens 17 through the input coupling facet or mirror 13 of the ring resonator.

The nonlinear optical material 12 has a low bulk loss, i.e., less than 0.003 cm$^{-1}$ and the reflective facets 13, 14, and 15 of the ring resonator have a low loss (scatter, transmission, etc.) at the fundamental wavelength such that the round trip losses for the fundamental wavelength are very low, i.e., less than 1 percent. In this manner, the dominant loss presented to the resonated fundamental wave energy is the conversion loss to the second harmonic.

The nonlinear optical material 12 is disposed within an oven 18 so as to elevate the temperature of the nonlinear optical material 12 to a phase-matched temperature of 107° C. so that the phase velocity of the resonated fundamental is matched to the phase velocity of the generated second harmonic for good conversion efficiency. A portion of the incident fundamental laser radiation reflected from the input face 13, as beam 19, is detected in detector 21 and fed back to an electro-optic feedback control circuit 22 which outputs a DC potential, up to 1,150 volts, applied across the nonlinear electro-optic material 12 in the Y-direction, for tuning the resonated mode of the optical resonator to the wavelength of the incident laser radiation derived from the ring laser 16.

The second harmonic laser radiation derived from the nonlinear material 12 is extracted from the external optical resonator through output mirror 14 as output beam 23.

The feedback control signal 22 is dithered for dithering the tuning of the resonated mode around the frequency of the incident laser radiation. The dithering produces a modulation of the reflected energy 19 about the null condition wherein the wavelength of the incident laser radiation corresponds exactly to the wavelength of the resonated mode of the optical resonator and the input mirror 13 is perfectly impedance matched, as more fully disclosed below.

In a typical physical realization of the harmonic generator 11, the diode ring laser 16 provides, for example, a 70 mW output TEM$_{00q}$ mode at 1.06 μm and is commercially available, as Model 120-03, from Lightwave Electronics Co. of Mountain View, Calif. Laser diode pumped ring lasers of this type are disclosed in U.S. Pat. No. 4,578,793 issued Mar. 25, 1986 and U.S. Pat. No. 4,749,842 issued June 7, 1988, the disclosures of which are hereby incorporated by reference. The nonlinear crystal 12 of MgO:LiNbO$_3$ was grown from a noncongruent melt so that the crystal growth direction and the propagation direction for the fundamental and second harmonic are along a common axis in order to avoid scattering from striae that arise during crystal growth from the noncongruent melt. Such a crystal is commercially available from Crystal Technology, Inc., Palo Alto, Calif.

The crystal 12 was polished on opposite ends to provide spherical mirrors 13 and 14 with a common axis of revolution disposed approximately 0.18 mm from the bottom face 15 of the resonator. The mirrors 13 and 14 had radii of curvature of approximately 10 mm. The totally internally reflecting face 15 of the resonator was polished to be parallel to the axis of revolution of the mirrors 13 and 14 and normal to the Z-axis and had a finish of better than 1/10 of a wave. The mirror surfaces 13, 14, and 15 were also free of scratch and dig to normal laser quality surfaces. The length L of the crystal 12 was 12.5 mm.

The mirrors 13, 14, and 15 were arranged so that the fundamental wavelength incident laser radiation was reflected around in a triangular path lying in the X-Z plane of the crystal. The angle $\theta$, that is the angle between the incident and reflected ray off of the end mirrors 13 and 14, was approximately 10 degrees. The crystal had a height in the Z-direction of approximately 2 mm and a width in the Y-direction of approximately 2 mm, and the surfaces of the crystal 12 normal to the Y axis were plated or coated with a conductive coating such as of an evaporated gold or silver paint to provide electrodes across which the electronic feedback tuning control signal derived from the feedback control circuitry 22 was applied. The crystal shaping and polishing services required to produce the external optical resonator are commercially available at the time of filing the application for patent from Crystal River Optics of Pleasanton, Calif., or Applied Optics of Pleasant Hills, Calif.

The input mirror $M_1$ 13 was coated to have a reflectivity of 98.3 percent at 1.06 $\mu$m. The output mirror $M_2$ 14 was coated to provided a high reflectivity at 1.06 $\mu$m, i.e., 0.04 percent transmitting at the fundamental, and 85 percent transmitting at the second harmonic. The bottom face 15 of the resonator was uncoated to provide total internal reflection. Coatings of this type are commercially available at the time of filing the application for patent from Virgo Optics of Port Richey, Fla.

The input or incident laser radiation at the fundamental wavelength was polarized parallel to the Y-axis as indicated at 31 and the oven 18 operated at 107° C. or thereabouts to obtain phase-matched operation between the fundamental and second harmonic over that arm of the resonator extending directly between the input mirror 13 and the output mirror 14. The second harmonic was generated in only one direction since the harmonic generation process is phase-matched only for the forward beam.

By applying a linear ramp voltage across the tuning electrodes spaced apart in the Y-direction and detecting the transmitted fundamental power when the crystal 12 was not at the phasematching temperature, a measurement of the finesse of the external optical resonator is obtained. Knowledge of the finesse enables the cavity losses to be determined. In the case where the crystal 12 was 12.5 mm in length L, the measured finesse was 292, indicating that the total scatter and absorption losses for the resonator were 0.42 percent at the fundamental.

Figure 5:
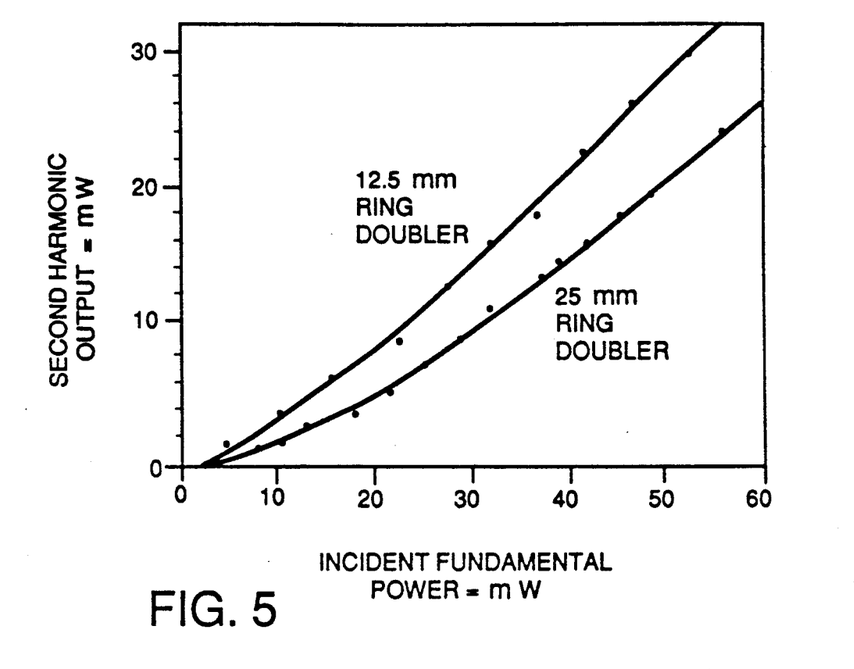
FIG. 5 is a plot of second harmonic output in mW as a function of incident fundamental power in mW for the operation described infra of physical realizations of the invention respectively having a 25 mm-long ring resonator with 20 mm radii of curvature mirrors with 13 mm phasematchable length and a 12.5 mm long ring resonator with 10 mm radii mirrors.

In operation of the described physical realization, the crystal 12 generated 29.7 mW of 532 nm power from an incident fundamental power of 52.7 mW, for a 56 percent conversion efficiency (see FIG. 5). At this level of incident power, the optical resonator 12 transmitted 2 percent as leakage and back-reflected 7.5 percent of the incident light. This rather large level of reflected light was probably due in large part to the astigmatism of the optical resonator. At 52 mW incident power, the circulating fundamental power was 3,000 mW, which represents an enhancement of 60 in the fundamental power. The loss of the circulating power to the second harmonic due to conversion was 1 percent, much more than the 0.42 percent scatter and absorption losses presented to the resonated mode of the optical resonator at the fundamental wavelength.

It should be noted that the 56 percent conversion efficiency represents the measured output of the optical resonator. If output mirror 14 had transmitted all of the generated second harmonic, the observed conversion efficiency would have been 66 percent. In addition, since improper spatial mode matching within the resonator limited the incoupled power to 92.5 percent of the incident power, the second harmonic generated from the incoupled power represents a 72 percent conversion efficiency. It should be noted that with proper spatial mode matching when the reflectivity of the input mirror 13 is properly impedance matched to the losses of the resonator, taking into account the conversion loss, all of the incident power is coupled into the resonated mode of the external optical resonator at the fundamental wavelength. The reflected power $P_r$ in beam 19 then goes to zero.

Figure 2:
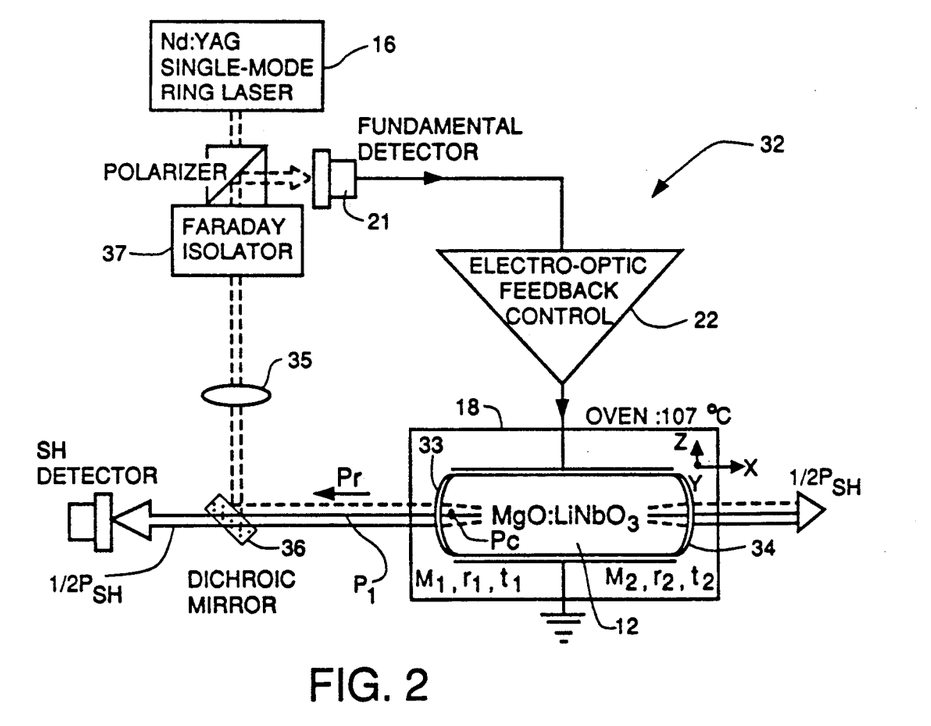
FIG. 2 is a view similar to that of FIG. 1 depicting an alternative embodiment of the present invention.

Referring now to FIG. 2, there is shown an alternative harmonic generator 32 incorporating features of the present invention. Harmonic generator 32 is similar to that previously described with regard to FIG. 1, except that the external optical resonator is of the standing wave type wherein two coaxial spherical facets are polished onto opposite ends of a rod of the nonlinear optical material 12 at 33 and 34 to define a standing wave resonator. As in the case of FIG. 1, the nonlinear material 12 for the embodiment was grown with the X-axis parallel to the axis of revolution of the spherical mirrors 33 and 34 of the resonator. In a physical realization of this embodiment, the resonator had a length L between mirrors 33 and 34 of 25 mm. The rod had a width in the direction of the Y-axis of 4 mm. The mirrors 33 and 34 had radii of curvature of 20 mm. The external optical resonator had a finesse of 450. The reflectivity of the input mirror 33 was 0.997 at the fundamental. The reflectivity of the output mirror 34 at the fundamental was 0.997. The round trip transmission within the resonator was 0.992. The spot size of the input beam is 38 $\mu$m and the coefficient of second harmonic generation was 0.0025 $Watt^{-1}$. As in the case of FIG. 1, the feedback control voltage was applied across the crystal 12 in the Y-direction.

The output of the single mode ring laser 16 was collimated with a lens, not shown, of focal length of 60 mm and carefully spatially mode-matched into the external standing wave optical resonator with the lens 35 having a focal length of 100 mm. Second harmonic output was generated in both directions. Dichroic beam splitters 36 allowed both harmonic outputs to be measured independent of the fundamental. A Faraday isolator 37 was used to collect the light reflected from the crystal cavity. This reflected light was minimized on resonance, and so was used as a feedback signal to lock the external optical resonator to the laser wavelength. To accomplish this locking the crystal voltage had a small dither 7.2 kHz applied. A lock-in amplifier with 3 Hz filter bandwidth was used to detect this component on the reflected light, and the resulting dispersive-shape signal was fed through a PI servo amplifier and then to the high-voltage amplifier within the feedback control circuitry 22.

In operation of this physical realization of this embodiment, with 15 mW of fundamental laser radiation incident on the optical resonator, 2 mW of second harmonic was generated for a total conversion efficiency of 13 percent. The phase-matched length was approximately 13 mm within the crystal 12. At this incident power level, the circulating power was 600 mW, representing an enhancement of 40 in the fundamental. At this power level, 2 mW was transmitted through the resonator (leaked) and 6 mW was back-reflected. This was due to the 99.7 percent mirror reflectivity for mirrors 33 and 34 at the fundamental. This caused a substantial leakage of circulating power through the second mirror 34 and did not provide impedance matching at the input mirror 33.

Diode-pumped Nd:YAG-driven external resonator harmonic generators are disclosed and claimed in U.S.

Pat. No. 4,739,507 issued Apr. 19, 1988, the disclosure of which is hereby incorporated by reference.

While the embodiments of FIGS. 1 and 2 have shown the external optical resonator to be tuned, by the feedback signal, to the wavelength of the incident laser radiation, this is not a requirement. Alternatively, the feedback signal may be applied to the laser generating the incident radiation at the fundamental mode for tuning the laser to the wavelength of the resonated mode within the external optical resonator. Also, any of a variety of techniques besides dither and lock-in detection may be used to detect coincidence of the external cavity resonance and laser frequency.

THEORY

The second harmonic conversion efficiency of an external optical resonator doubler may be determined from the theory of Ashkin, Boyd, and Dziedzic appearing in IEEE J. Quantum Electronics, Vol. QE-2, pp. 109-123 of June 1966, the disclosure of which was incorporated by reference, above. FIGS. 1 and 2 show two monolithic external optical resonator geometries. Note that the standing wave cavity of FIG. 2 is phasematched for both the forward and backward propagating intracavity beams, resulting in two second harmonic outputs. The ring geometry of FIG. 1 is phasematched only for the forward beam and therefore generates second harmonic in a single direction. Following the notation of the aforedescribed, Ashkin, et al., article, let $r_1$ and $r_2$ be the power reflection coefficients of the cavity mirrors $M_1$ and $M_2$, and let $t_1$ and $t_2$ be their power transmission coefficients. The mirrors are assumed to be lossless, so that $r_1 + t_1 = r_2 + t_2 = 1$. Any real scatter losses in the mirrors can be included in t, the single pass power transmission coefficient of the material of the resonator. $P_1$ is the fundamental power incident on the external optical resonator and $P_r$ is the fundamental power reflected form the external optical resonator. $P_c$ is the circulating fundamental power just inside the input mirror $M_1$, of the external optical resonator. The crystal transmission and the mirror reflectivities are assumed to be nearly unity, so that the circulating power may be approximated as being constant throughout the crystal 12.

In keeping with the invention, in some circumstances, it is useful to extend the aforedescribed theory to take into account depletion of the resonated fundamental due to the doubling process, i.e., the conversion loss. As long as the conversion loss of the circulating power to the second harmonic remains small, it can be described by an additional crystal transmission term $t_{SH}$. Let $$t_{SH} = (1 - \gamma_{SH} P_c) \qquad \text{(Eq. 1)}$$

be the fraction of resonated fundamental not frequency doubled in a single pass through the crystal, where $$\gamma_{SH} P_c = \eta_{SH} \qquad \text{(Eq. 2)}$$

is the conversion efficiency of the resonated fundamental to the second harmonic.

The nonlinear conversion factor $\nu_{SH}$ can be derived using the formalism of Boyd and Kleinman for a focussed Gaussian beam published in the Journal of Applied Physics, Vol. 39, pp. 3597-3639, of July 1968, hereby incorporated by reference. For an interaction length L in a crystal of index of refraction n with an effective nonlinear coefficient $d_{eff}$, as defined in a text titled, Nonlinear Optics, edited by P. G. Harper and B. S. Wherrett, and published in San Francisco by Academic Press in 1977 at pages 47-160 (hereby incorporated by reference).

$$\gamma_{SH} = \left( \frac{2\omega^2 d_{eff}^2 k_\omega}{\pi n^3 \epsilon_0 c^3} \right) L h(B,\xi) \qquad \text{(Eq. 3)}$$

where $\omega$ is the laser fundamental frequency, $k\omega$ is the fundamental wave vector, n is the index of refraction of the crystal, c is the speed of light, and $\epsilon_0$ is the permitivity of free space. $h(B,\xi)$ is the Boyd and Kleinman focussing factor, with the double refraction parameter $\xi B$ and focussing parameter. For noncritical (90°) phasematching, there is no walk off and B=0. The focussing parameter for a spot size of $w_0$ is $$\xi = \frac{L}{w_0^2 k_\omega} = \frac{L}{b}$$

for a confocal parameter b. The nonlinear conversion factor $\nu_{SH}$ for MgO:LiNbO$_3$, with a $d_{eff} = 5.9 \times 10^{-12}$ m/V and an n=2.23 for doubling 1064 nm radiation, is=0.35 $Lh(0,\xi)$ for L expressed in meters.

The resonated fundamental and therefore second harmonic output can be found in terms of the crystal transmission and cavity mirror characteristics. It is useful to define a term $r_m$, the cavity reflectance parameter, which represents the fraction of resonated fundamental left after one round trip inside the cavity. For the ring cavity (FIG. 1), which generates second harmonic in only one direction, the cavity reflectance parameter becomes $$r_m = t^2 \, t_{SH} r_2. \qquad \text{(Eq. 4a)}$$

For the standing wave geometry (FIG. 2), which generates second harmonic in both directions, $$r_m = t^2 \, t_{SH}^2 r_2. \qquad \text{(Eq. 4b)}$$

The significance of the cavity reflectance parameter can be seen in the expression for the reflected fundamental power. On resonance, $$\frac{P_r}{P_1} = \frac{(\sqrt{r_1} - \sqrt{r_m})^2}{(1 - \sqrt{r_1 r_m})^2} \qquad \text{(Eq. 5)}$$

If $r_1 = r_m$, then $P_r = 0$ and all of the incident power is coupled into the external cavity. Choosing this mirror reflectivity "impedance matches" the resonator. Since $r_m$ depends on $P_c$ through $t_{SH}$, this impedance matching condition is dependent on the incident power level and on the doubling efficiency.

The enhancement of the fundamental power on resonance is given by $$\frac{P_c}{P_1} = \frac{t_1}{(1 - \sqrt{r_1 r_m})^2}, \qquad \text{(Eq. 6)}$$

which also determines the circulating power. Due to the dependence of $r_m$ on the circulating power, Equation 6 is a cubic equation in $P_c$. This is easiest to solve numerically for the specific system and power level of interest. The expected second harmonic output is determined by $P_c$. For the ring geometry, (FIG. 1)

$$P_{SH} = \gamma_{SH} P_c^2. \qquad (Eq. 7a)$$

For the standing wave geometry $$P_{SH} = 2\gamma_{SH} P_c^2, \qquad (Eq. 7b)$$

which represents the sum of the forward and backward propagating second harmonic outputs. The overall conversion efficiency is given by $P_{SH}/P_1$.

To achieve the best conversion efficiency with a given system, the input mirror reflectivity must be chosen to impedance match the resonator to minimize the fundamental power reflected from the cavity and so maximize the power coupled into the resonator. Impedance matching is achieved by choosing the input mirror transmission to be equal to the total of all the other cavity losses (bulk and scatter losses in the crystal, the output mirror transmission at the fundamental, and the conversion of the resonated wave to the second harmonic). The algorithm for achieving impedance matching therefore requires that the input power to the doubler is known.

The best method of choosing the proper incoupler reflectivity for a given system is to assume an impedance matched cavity and then solve for the resulting circulating power and doubling efficiency. The reflectance parameter of the impedance matched cavity can then be computed. The input mirror reflectivity that will impedance match the cavity is equal to this reflectance parameter. Assuming an impedance matched cavity ($r_1 = r_m$, $t_1 = 1 - r_m$), Equation (6) results in $$P_{cm} = \frac{P_1 t_1}{(1 - \sqrt{r_1 r_m})^2} = \qquad (Eq. 8)$$

$$\frac{P_1 (1 - r_m)}{(1 - r_m)^2} = \frac{P_1}{1 - r_m} = \frac{P_1}{1 - (t^2 r_2 (1 - \gamma_{SH} P_{cm}))}$$

when $P_{cm}$ is the circulating power when impedance matched. This gives a quadratic equation in $P_{cm}$, which is easily solved. The solution $$P_{cm} = \frac{t^2 r_2 - 1 + \sqrt{(t^2 r_2 - 1)^2 + 4t^2 r_2 \gamma_{SH} P_1}}{2t^2 r_2 \gamma_{SH}} \qquad (Eq. 9)$$

then gives the anticipated circulating intensity when impedance matched for a given input power and system. The mirror reflectivity $r_1$ that provides for this impedance matching is given by $$r_1 = r_m = t^2 r_2 (1 - \gamma_{SH} P_{cm}). \qquad (Eq. 10)$$

Figure 3:
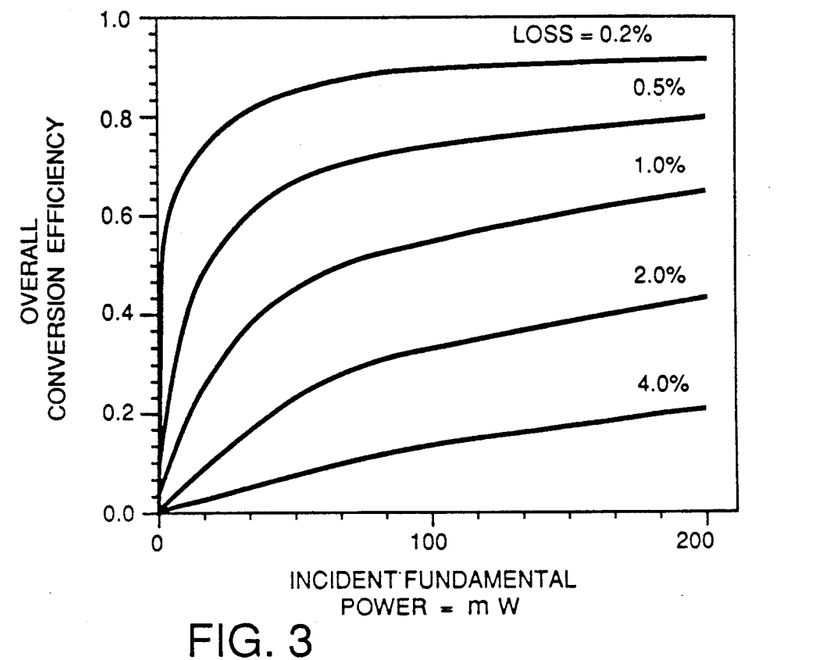
FIG. 3 is a plot of overall conversion efficiency versus incidental fundamental power in milliwatts for various values of round trip cavity loss assuming perfect impedance matching at each incident power level with a confocally focused ring geometry of a 12.5 mm long (L) crystal of LiNbO$_3$ having a coefficient of second harmonic generation $\gamma_{SH}=0.0028$ per Watt.
Figure 4:
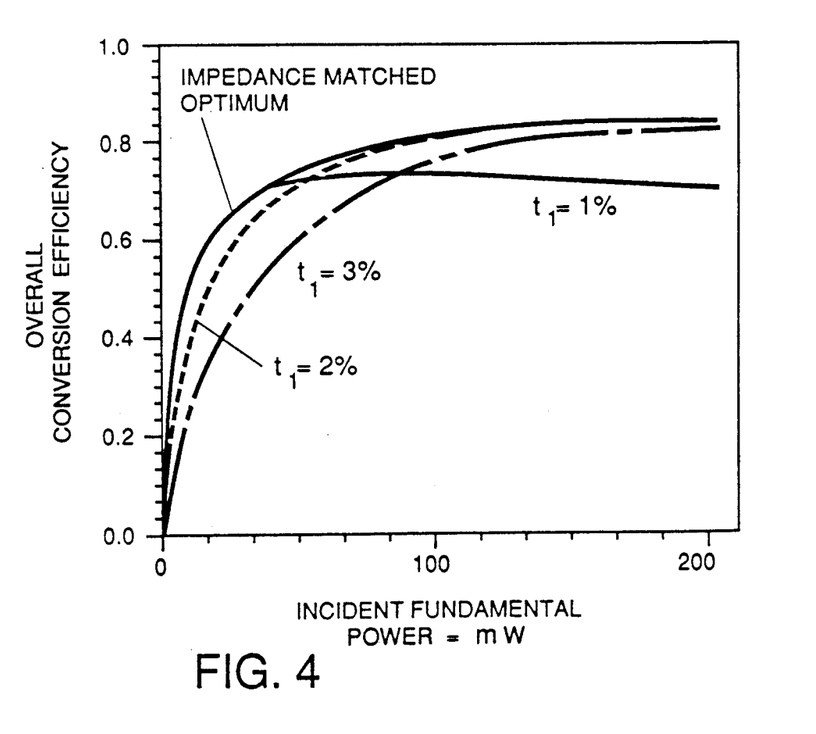
FIG. 4 is a plot of overall conversion efficiency versus incident fundamental power in milliwatts as a function of the transmission coefficient of the input coupler of the external optical resonator in comparison to the impedance matched optimum and assuming confocally focused ring geometry with a bulk loss of 0.0015 per centimeter.

The importance of using low loss crystals with properly impedance matched external optical resonators is seen by using the above equations in a numerical example. FIG. 3 shows the maximum conversion efficiency expected for a monolithic ring external doubler for various levels of round trip loss (defined as $1 - t^2$) as a function of input power, where perfect impedance matching is assumed at all input powers. Since operation at a specific $r_1$ is necessary for monolithic devices, perfect impedance matching is only possible at a particular level. FIG. 4 shows the output powers expected for particular input mirror reflectivities as a function of input power as compared to the impedance matched optimum. It should be noted that although the conversion efficiency peaks for each specific $r_1$, the second harmonic power still increases monotonically as a function of input power.

Figure 6:
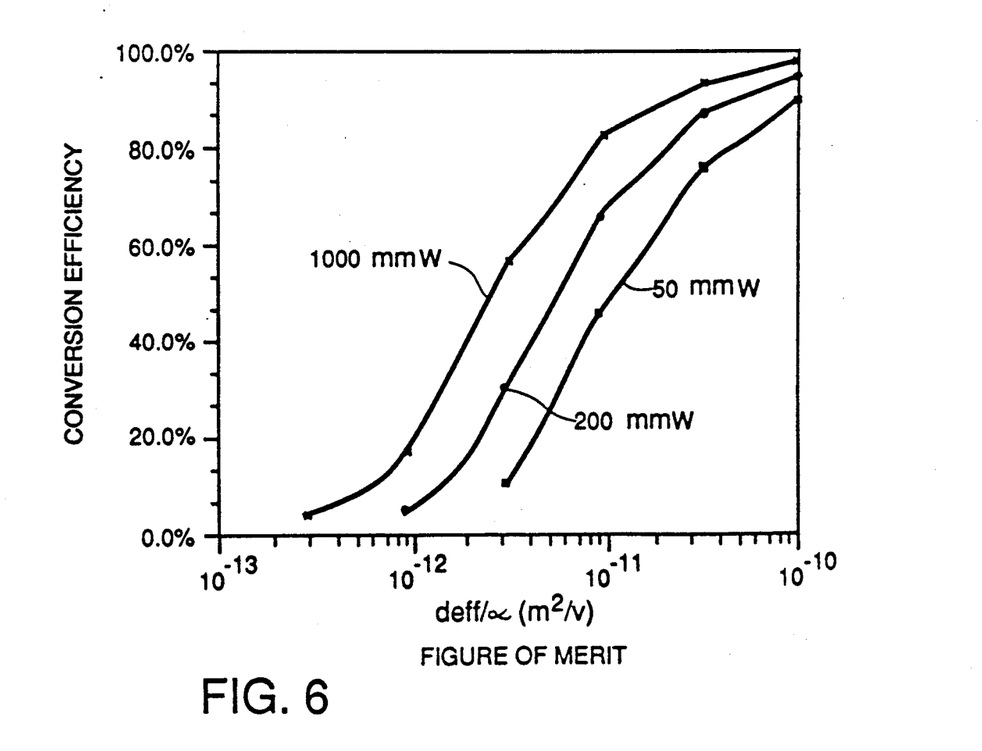
FIG. 6 is a plot of conversion efficiency in percent versus figure of merit ($d_{eff}/\alpha$) for the nonlinear optical material for three different values of incident power.

Materials other than MgO:LiNbO$_3$, as a nonlinear material, include potassium niobate (KNbO$_3$), KTP, KDP, KD*P and isomorphs, lithium iodate, barium borate, and other forms of LiNbO$_3$ (congruent, lithium equilibrated, periodically poled). A good figure of merit turns out to be simply the ratio of the second order nonlinear coefficient, $d_{eff}$, to loss coefficient, $\alpha$. The required figure of merit does depend on the anticipated input power and desired doubling efficiency. For greater than 20 percent conversion efficiency, a material should have a figure of merit of greater than $4 \times 10^{-12}$ (m$^2$/v) for a 50 mW input, $2 \times 10^{-12}$ (m$^2$/v) for a 200 mW input, and $1 \times 10^{-12}$ (m$^2$/v) for a 1 W input. For greater than 50 percent conversion efficiency, a material should have a figure of merit of greater than $1.5 \times 10^{-11}$ (m$^2$/v) for a 50 mW input, $6 \times 10^{-12}$ (m$^2$/v) for a 200 mW input, and $2 \times 10^{-12}$ (m$^2$/v) for a 1 W input (See FIG. 6).

In practice, the nonlinear crystal will have some scatter loss at the surfaces and at the coatings. In materials whose bulk losses are as low as these fixed losses, the figure of merit must use the combined loss figure. Materials with very low material loss but with low nonlinear coefficients (such as KDP) are useful, but require more attention to the degree of polish and coating losses than some of the other materials.

The best conversion efficiency is obtained with short crystals (shortened to the point where the bulk losses equal the surface and mirror losses). The advantage of short crystals is they provide the lowest loss cavities having the largest circulating powers providing the best overall doubling efficiency.

Figure 7:
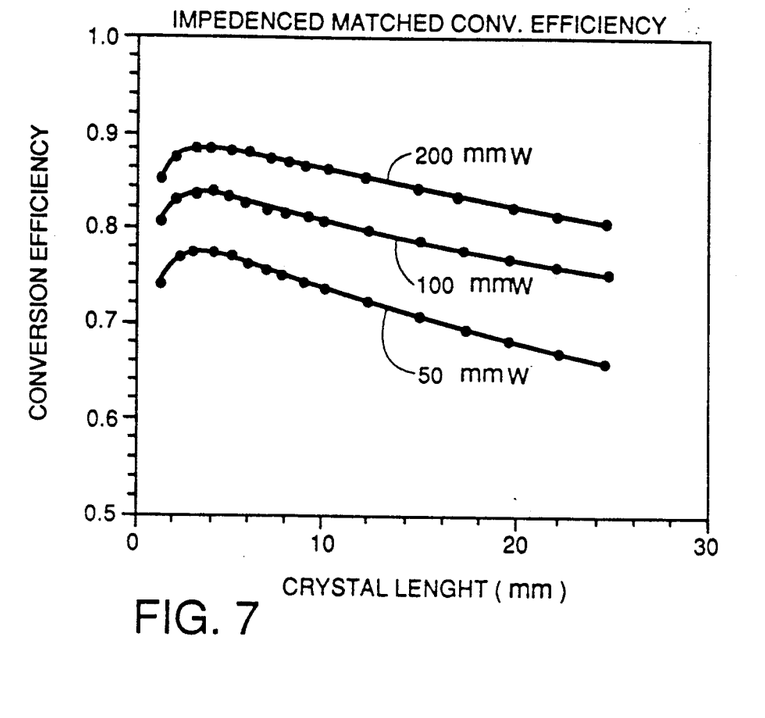
FIG. 7 is a plot of the expected conversion efficiency versus crystal length L, in mm, for operation of the generator described in FIG. 1 for three different values of incident laser power, and assuming that the resonator is impedance matched.
Figure 8:
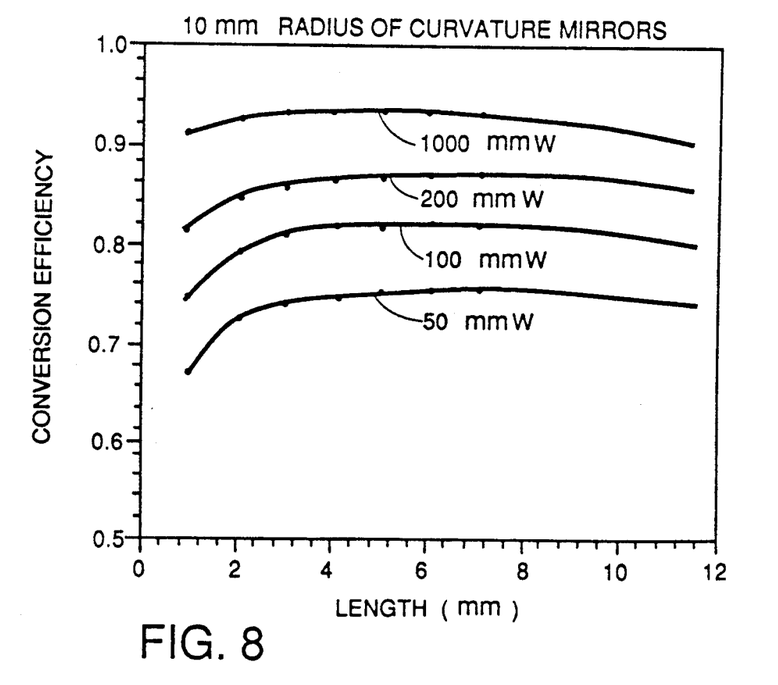
FIG. 8 is a plot of the expected conversion efficiency versus length L, in mm, of the operation of the generator described in FIG. 1 for four different values of incident laser power and assuming a constant 10 mm radius of curvature for the mirrors of the resonator.

The aforedescribed impedance matching equations, taking into account the conversion loss term, can be used to project device performance with changing crystal length, and the conversion efficiency is seen to be a maximum with very short crystals. FIG. 7 illustrates the expected conversion efficiency versus length that results from scaling the ring geometry and mirror curvatures used for the 56 percent conversion efficiency device of FIG. 1. If fabrication demands required keeping the mirror curvatures fixed at 10 mm radii (a worst case, unrealistic situation), the conversion efficiency would still not decrease significantly with length as shown in FIG. 8. Shorter crystals, i.e., less than 5 mm, offer a number of advantages: lower material costs, easier fabrication, and wider temperature phasematching bandwidth (yielding easier oven control). Using shorter crystals also opens up the possibility of using many angle phasematched nonlinear crystals, such as KTP, KDP, KD*P and its Isomorphs, Lithium Niobate, AgGaSe$_2$ and related Calco Pyrites, GaAs, and Barium Borate, that would ordinarily have too large a walkoff angle.

DISCUSSION

By going to a low-loss optical resonator, i.e., where a significant loss presented to the resonated mode of the external optical resonator, as coupled into the low-loss nonlinear optical material, is the conversion loss to the harmonic, and by taking into account the conversion loss when impedance matching the reflectivity of the input coupling mirror to the external resonator, greatly enhanced conversion efficiencies are obtained. Moreover, conversion efficiency is clamped to the input power as shown in FIG. 7. This clamping results in power fluctuations of the laser 16 transferring linearly to power fluctuations of the second harmonic (instead of transferring as the square of the laser power fluctuations as in an unclamped case). Moreover, the conversion efficiency under these conditions is seen to be a maximum with very short crystals. These shorter crystals offer a number of advantages, as above described.

As used herein, "harmonic generation" is defined to include sum frequency mixing, as second harmonic generation is simply the specific case of mixing of two summed waves of equal frequency.

As thus far described, the harmonic generator of FIGS. 1 and 2 has been operated cW. This is not a requirement inasmuch as the harmonic generator may be operated in a pulsed mode. In the pulsed mode, the incident laser radiation is preferably polarized and single-mode, or if multiple axial modes they should have the same optical path length as the nonlinear optical material. In addition, the incident laser linewidth should be less than the linewidth in the nonlinear optical resonator which is not a restrictive requirement in most cases.

What is claimed is:

1. In a laser harmonic generator for converting laser energy of an input beam from a fundamental wavelength of said beam to a harmonic of that wavelength, the combination comprising:
   an optical resonator configured to resonate said fundamental wavelength and having an input coupler for introducing said input beam into the same; and
   a non-linear material within said resonator for generating said harmonic by conversion of said fundamental wavelength, said input coupler being impedance matched to said resonator taking into account the conversion loss to said harmonic.

2. The laser harmonic generator of claim 1 wherein said input coupler is impedance matched to said resonator by having its transmission of said fundamental wavelength into said resonator generally equal to the total of the linear and nonlinear losses in the resonator of the fundamental wavelength.

3. The laser harmonic generator of claim 1 wherein said non-linear material has a figure of merit that is greater than $4 \times 10^{-12}$ (m²/v) for a 50 mW input beam, $2 \times 10^{-12}$ (m²/v) for a 200 mW input beam, and $1 \times 10^{-12}$ (m²/v) for a 1 W input beam.

4. The laser harmonic generator of claim 1 wherein:
   said optical resonator is a monolithic resonator defined essentially by optically reflective facets of said nonlinear optical material.

5. The laser harmonic generator of claim 1 further including:
   tuning means for tuning the resonated mode of said optical resonator and the fundamental laser radiation coupled into said resonator means to the same wavelength.

6. The laser harmonic generator of claim 1 wherein:
   said nonlinear optical material is selected from the group consisting of potassium niobate, KTP<KDP<KD*P and its isomorphs, lithium iodate, barium borate, lithium niobate, MgONbO$_3$, urea, AgGaSe$_2$, and its chalcopyrites, and GaAs.

7. The laser harmonic generator of claim 1, wherein:
   said nonlinear optical material has a length selected so that its bulk losses are less than ten times the sum of the surface and mirror losses of said optical resonator.

8. The laser harmonic generator of claim 1 further including:
   phasematching means for phasematching the generated harmonic wave energy with the resonated fundamental laser radiation within the nonlinear optical material.

9. The laser harmonic generator of claim 1, further including;
   mode matching means for matching the mode cross-section of the incident fundamental laser radiation with that of the resonated fundamental wave energy within the nonlinear optical material.

10. The laser harmonic generator of claim 1, wherein;
    said optical resonator is configured such that the round trip optical loss of the resonated fundamental mode, exclusive of the conversion loss to the second harmonic, is less than 2 percent.

11. The laser harmonic generator of claim 1 further including;
    a laser source for providing said input beam, said laser source including means for generating the source laser radiation as a TEM$_{00q}$ mode.

12. The laser harmonic generator of claim 11, wherein;
    said laser source includes a nonplanar monolithic ring resonator of laser gain material.

13. In a laser harmonic generator:
    a solid monolithic optical resonator of a nonlinear optical material with the optical resonator defined by internally reflective facets of said nonlinear optical material;
    an input coupler defined by one of said reflective facets of said nonlinear optical material for coupling an input beam of laser radiation from an external laser source into said optical resonator for exciting a resonant mode thereof to convert resonated fundamental laser radiation into harmonic laser radiation within said optical resonator; and
    said input facet having a coating to impedance match said optical resonator to minimize the power of the fundamental laser radiation which is reflected from said input coupler and to maximize the fundamental laser power coupled by said optical coupler into said optical resonator, taking into account the conversion loss to the generated harmonic.

14. The laser harmonic generator of claim 13, wherein:
    said optical resonator of nonlinear optical material has a length selected such that the bulk losses are less than ten times the sum of the surface and mirror losses as presented to the resonated mode of said resonator, whereby the conversion efficiency to the generated harmonic is improved.

15. The laser harmonic generator of claim 13, wherein;
    said monolithic optical resonator is a ring resonator of nonlinear optical material with the generated harmonic wave phasematched to the resonated fundamental wave essentially only in one direction around the ring such that the resonated mode supports harmonic wave generation in essentially only one direction.

16. The laser harmonic generator of claim 13, including:

a heater thermally associated with said optical resonator for elevating its temperature such that the phase velocity of the generated harmonic wave is matched to the phase velocity of the resonated fundamental wavelength.

17. The laser harmonic generator of claim 13, including:

a tuner for tuning the wavelength of the resonated mode of said optical resonator and said fundamental wavelength of laser radiation to the same wavelength.

18. The laser harmonic generator of claim 13, including:

a laser source of the fundamental laser radiation;
said laser source including an optically-pumped monolithic nonplanar ring resonator of laser gain material lasing at the fundamental wavelength and producing the input beam to be coupled into said monolithic nonlinear optical resonator.

* * * * *